UNITED STATES PATENT OFFICE.

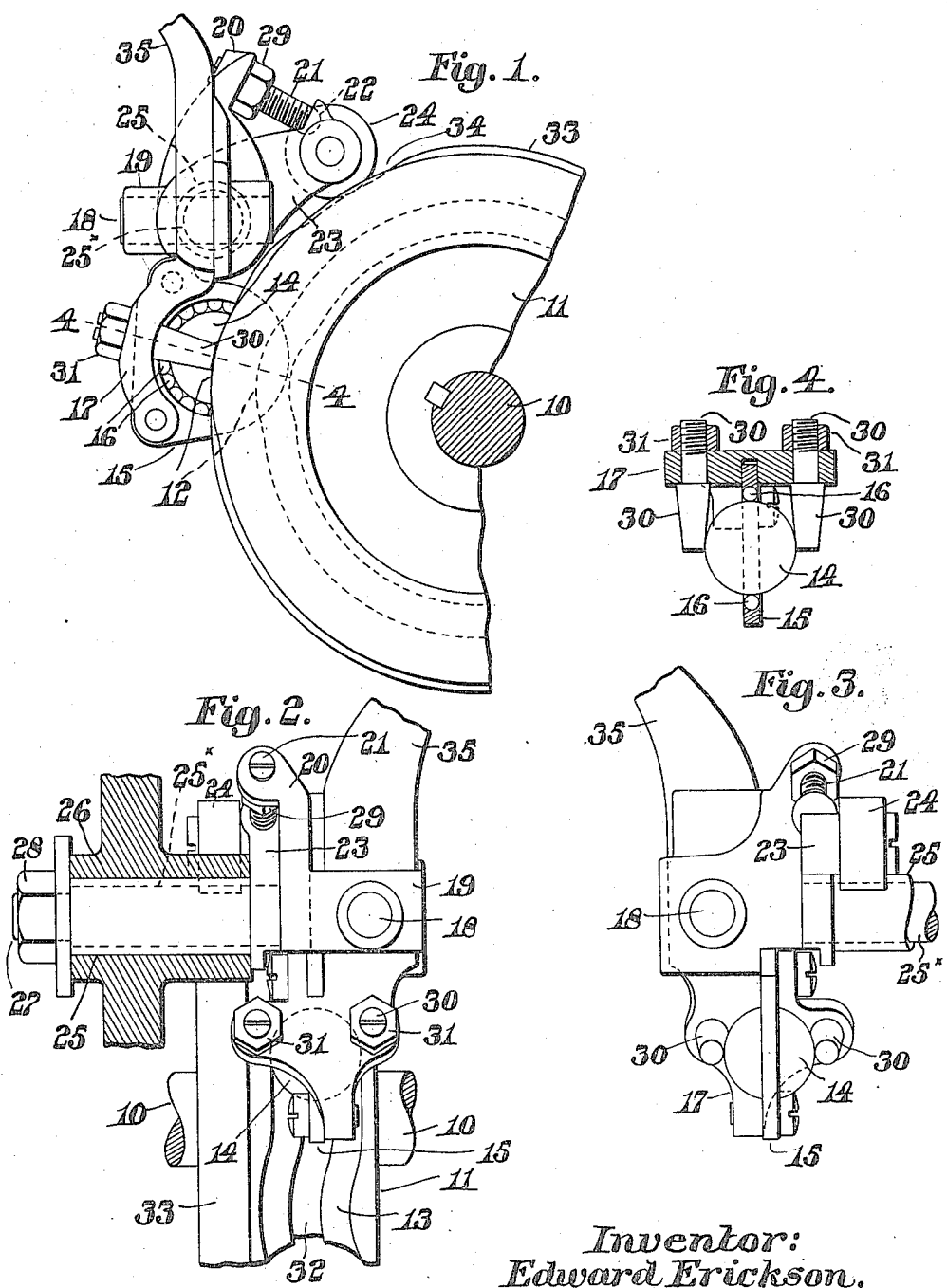

EDWARD ERICKSON, OF LYNN, MASSACHUSETTS, ASSIGNOR TO VICTOR SHOE MACHINERY COMPANY, OF BOSTON, MASSACHUSETTS, A CORPORATION OF MASSACHUSETTS.

MECHANICAL MOVEMENT.

1,169,715.   Specification of Letters Patent.   Patented Jan. 25, 1916.

Application filed April 24, 1915.   Serial No. 24,136.

*To all whom it may concern:*

Be it known that I, EDWARD ERICKSON, a subject of the King of Sweden, and a resident of Lynn, in the county of Essex and State of Massachusetts, have invented certain new and useful Improvements in Mechanical Movements, of which the following is a specification.

This invention relates to mechanical movements and has for its object the provision of a new device of this character which may be used in connection with many different forms of machines employed for various purposes.

The invention consists in certain novel features of construction and arrangement of parts which will be fully understood by reference to the description of the drawings and to the claims hereinafter given.

Of the drawings, Figure 1 represents a side elevation of a device embodying the principles of the present invention. Fig. 2 represents a front elevation of the same showing the supporting bearing in section. Fig. 3 represents a rear elevation of the same, and Fig. 4 represents a horizontal section, the cutting plane being on line 4—4 on Fig. 1.

Similar characters designate like parts throughout the several figures of the drawings.

In the drawings, 10 is a revoluble shaft having keyed thereto a cam disk 11 having a peripheral cam throw 12 and a peripheral cam path 13. The cam path 13 is preferably concave and adapted to receive a large ball 14 mounted in a raceway of a member 15, said raceway carrying a plurality of antifriction members such as the small balls 16 on which said ball 14 is adapted to freely rotate. The raceway 15 is secured to one end of a lever 17 pivoted at 18 to the oscillating member 19. The oscillating member 19 is provided with an arm 20 to which is threaded a strut 21 the outer rounded end of which is positioned in a socket 22 in an arm 23 having at one end a roller 24 engaging the periphery of the cam disk 11 while the opposite end of said arm 23 is provided with a sleeve 25 surrounding a stud $25^x$. Both the stud $25^x$ and the sleeve 25 are adapted to oscillate in the fixed bearing 26. The stud $25^x$ is provided with a reduced threaded end 27 on which is mounted a nut 28 adapted to prevent the displacement of the oscillating member 19 and the stud $25^x$ from the sleeve 25.

The arm 23 being interposed between the member 19 and the end of the bearing 26 is prevented from endwise movement but is free to oscillate about the axis of the sleeve 25 in its bearing 26. The strut 21 may be adjusted in the arm 20 and secured in its adjusted position by means of the nut 29, thereby insuring the ball 14 seating itself in the path 13 as the roller 24 follows the periphery of the disk 11. The lever 17 is provided with tapered studs 30 secured thereto by means of the nuts 31. The axes of these studs 30 are paralleled and said studs are disposed on opposite sides of the ball 14 with their outer and smaller ends opposite the center of said ball as shown in Fig. 4 of the drawings. These studs 30 prevent the ball 14 from being displaced from the raceway 15 and the antifriction members 16 carried thereby. It will be observed from an inspection of the drawings that by the construction shown therein the ball 14 is free to move in any direction.

The cam disk 11 is provided with a deep recess 32 in the bottom of the cam path 13, this recess or depression 32 being adapted to receive the projecting end of the raceway 15 so that the surface of the ball 14 may contact with the concaved surface of the cam path 13. It will be observed by an inspection of Fig. 1 of the drawings that the center of the ball 14 is located on one side of the axis of the stud $25^x$, while the roller 24 is located on the opposite side of said axis. This roller 24 coacting with the cam surface 33 on the disk 11 is intended to retain the ball 14 at all times in contact with its cam path 13, and to this end the cam surface 33 is provided with a depression 34 so that when the ball 14 is passing over the peripheral cam throw 12 the roller 24 may move inwardly toward the axis of the shaft 10. The arm 35 extending inwardly from the lever 17 may be connected with some portion of a machine and have imparted to it by the combined cam throws 12 and 13 an orbital movement.

It will be noted that the shanks of the projections 30 are eccentric to bases thereof and are provided at their ends with slots by which said projections may be turned about the axes of said shanks, thereby reducing the distance between the adjacent walls of said projections. When thus adjusted the projections 30 are again locked in position by the nuts 31. By this construction whenever the ball 14 becomes worn and reduced in diameter the projections may be adjusted to take up the wear. When the ball 14 becomes so worn as to fail to function properly, it may be replaced with a new one without discarding the other parts of the device. Inasmuch as the ball 14 is free to revolve in any and all directions about its center, it will last much longer than the cam path engaging members now in general use.

It is believed that the operation and many advantages of this invention will be fully understood from the foregoing description.

Having thus described my invention, I claim:

1. The combination of a revoluble disk having a peripheral cam path and a peripheral cam throw on one side thereof; a pivoted member provided with an arm; a roll on said arm coacting with the periphery of said disk; a lever pivotally mounted on said member and having two parallel projections thereon; a ball revoluble between said projections and positioned within said cam path; and a raceway for said ball carried by said lever and interposed between said projections.

2. The combination of a revoluble disk having a peripheral cam path and a peripheral cam throw on one side thereof; a pivoted member provided with an arm, a roll on said arm coacting with the periphery of said disk; a lever pivotally mounted on said member and having two parallel projections thereon; a ball revoluble between said projections and positioned within said cam path; a raceway for said ball carried by said lever and interposed between said projections; and a plurality of antifriction members in said raceway engaging said ball.

3. The combination of a revoluble disk having a peripheral cam path and a peripheral cam throw on one side thereof; a pivoted member provided with an arm, a roll on said arm coacting with the periphery of said disk; a lever pivotally mounted on said member and having two parallel projections thereon; a ball revoluble between said projections and positioned within said cam path; a member secured to said lever midway of said projections and having a concaved annular raceway; a plurality of small balls in said raceway; and a large ball positioned between said projections in the center of said raceway and adapted to coact with said cam path.

4. The combination of a revoluble disk having a peripheral cam path and a peripheral cam throw on one side thereof; a pivoted member provided with an arm, a roll on said arm coacting with the periphery of said disk; a lever pivotally mounted on said member and having two parallel projections thereon; a ball revoluble between said projections and positioned within said cam path; a member secured to said lever midway of said projections and having a concaved annular raceway; a plurality of small balls in said raceway; and a large ball positioned between said projections in the center of said raceway and adapted to coact with said cam path, said projections terminating at the center of said ball.

5. The combination of a revoluble disk having a peripheral cam path and a peripheral cam throw on one side thereof; a pivoted member provided with an arm; a roll on said arm coacting with the periphery of said disk; a lever pivotally mounted on said member having two tapered projections thereon; a ball revoluble between said projections and positioned within said cam path; and a raceway for said ball carried by said lever and interposed between said projections.

6. The combination of a revoluble disk having a peripheral cam path and a peripheral cam throw on one side thereof; a pivoted member provided with an arm; a roll on said arm coacting with the periphery of said disk; a lever pivotally mounted on said member and having two tapered projections thereon; a ball revoluble between said projections with its center alined with the ends thereof and positioned within said cam path; and a raceway for said ball carried by said lever and interposed between said projections.

7. The combination of a revoluble disk having a peripheral cam path and a peripheral cam throw on one side thereof; a pivoted member provided with an arm; a roll on said arm coacting with the periphery of said disk; a lever pivotally mounted on said member and having two removable projections thereon; a ball revoluble between said projections and positioned within said cam path; and a raceway for said ball carried by said lever and interposed between said projections.

8. The combination of a revoluble disk having a peripheral cam path and a peripheral cam throw on one side thereof; a pivoted member provided with an arm; a roll on said arm coacting with the periphery of said disk; a lever pivotally mounted on said member and having two parallel projections thereon; a ball revoluble between said projections and positioned within said cam path; and a removable raceway for said ball carried by said lever and interposed between said projections.

9. The combination of a revoluble disk having a peripheral cam path and a peripheral cam throw on one side thereof; a pivoted member provided with an arm; a roll on said arm coacting with the periphery of said disk; a lever pivotally mounted on said member and having two parallel projections thereon; a ball revoluble between said projections and positioned within said cam path; a removable member secured to said lever midway of said projections and having a concaved annular raceway; a plurality of small balls in said raceway; and a large ball positioned between said projections in the center of said raceway and adapted to coact with said cam path.

10. The combination of a revoluble disk having a peripheral cam path and peripheral cam throws on opposite sides thereof; a pivotally mounted member having two arms one of which is provided with an annular raceway and two projections disposed equidistant from said raceway on opposite sides thereof; a large ball in said raceway between and contacting with said projections, said ball being adapted to coact with said cam path; a pivoted arm; a roll on said arm engaging the periphery of said cam disk; and an adjustable strut between the other arm of said pivoted member and said pivoted arm.

11. The combination of a revoluble member having a cam path; a pivoted member provided with an annular raceway; a large ball in said raceway adapted to coact with said cam path; and means on each side of said raceway for positioning said ball therein.

12. The combination of a revoluble member having a cam path; a pivoted member provided with an annular raceway having a plurality of anti-friction members; a large ball in said raceway movable on said anti-friction members and adapted to coact with said cam path; and means on each side of said raceway for positioning said ball therein.

13. The combination of a revoluble member having a cam path; a pivoted member provided with an annular raceway; a large ball in said raceway adapted to coact with said cam path; and a projection on each side of said raceway for positioning said ball therein.

14. The combination of a revoluble member having a cam path; a pivoted member provided with an annular raceway; a large ball in said raceway adapted to coact with said cam path; and a tapered projection on each side of said raceway for positioning said ball therein.

15. The combination of a revoluble member having a cam path; a pivoted member provided with an annular raceway; a large ball in said raceway adapted to coact with said cam path; and means on each side of said raceway for positioning said ball therein and terminating opposite the center of said ball.

16. The combination of a revoluble member having a cam path; a pivoted member provided with an annular raceway; a large ball in said raceway adapted to coact with said cam path; a projection eccentrically mounted in said lever on each side of said ball; and means for adjusting said projection about the axis of its support.

17. The combination of a revoluble member having a cam path; a pivoted member provided with an annular raceway; a large ball in said raceway adapted to coact with said cam path; a tapered projection eccentrically mounted in said lever on each side of said ball; and means for adjusting said projection about the axis of its support.

18. The combination of a revoluble member having a cam path; a pivoted member provided with an annular raceway; a large ball in said raceway adapted to coact with said cam path; projections on opposite sides of said ball, each projection having a cylindrical shank extending eccentrically from its base and mounted in said lever and about the axis of which said projection may be rotated; and means for locking said projections in adjusted position.

19. The combination of a revoluble member having a cam path and a projecting cam throw; a lever; a cam path engaging member on said lever; an arm connected to said lever; and a roller thereon adapted to bear upon the surface of said revoluble member and retain said member on said lever in engagement with said cam path.

20. The combination of a revoluble disk having a peripheral cam path and a peripheral cam throw; a lever; a cam path engaging member on said lever; an arm connected to said lever; a roller thereon adapted to bear upon the periphery of said disk and retain said member in engagement with said cam path; and means for adjusting the position of said arm relatively to said lever.

Signed by me at 4 Post Office Sq., Boston, Mass., this 22nd day of April, 1915.

EDWARD ERICKSON.

Copies of this patent may be obtained for five cents each, by addressing the "Commissioner of Patents. Washington, D. C."